United States Patent [19]

Bialek

[11] Patent Number: 4,644,243
[45] Date of Patent: Feb. 17, 1987

[54] STATIC SWITCHES FIRING SYSTEM
[75] Inventor: Edward J. Bialek, Buffalo, N.Y.
[73] Assignee: Westinghouse Electric Corp., Pittsburgh, Pa.
[21] Appl. No.: 774,125
[22] Filed: Sep. 9, 1985
[51] Int. Cl.[4] ............................................. H02P 5/40
[52] U.S. Cl. ..................................... 318/807; 318/810
[58] Field of Search ............................... 318/807–811, 318/345 E; 363/41

[56] References Cited
U.S. PATENT DOCUMENTS 4,346,434  8/1982  Morinaga ........................ 318/345 E
4,427,933  1/1984  Wagener.

OTHER PUBLICATIONS

Microprocessor–Based Control of an AC Motor Drive, C. W. Edwards, IEEE-IAS Conference Records, Oct. 1982, pp. 1–5.

Primary Examiner—David Smith, Jr.
Attorney, Agent, or Firm—C. M. Lorin

[57] ABSTRACT

In a static DC/AC converter sequentially fired in relation to the frequency of the AC power supply, gating is provided by down counters which are instantly advanced, or delayed, in accordance with a change in the reference frequency, thereby to provide instantaneous firing angle adjustment.

6 Claims, 10 Drawing Figures

STATIC SWITCHES FIRING SYSTEM

BACKGROUND OF THE INVENTION

The present invention relates to computerized static converter control in general, and more particularly to inverter control in an adjustable frequency AC motor drive.

It is known to implement digital control of the thyristors of an AC motor drive with the aid of a computer. See for instance U.S. Pat. No. 4,427,933. As disclosed in the patent, for inverter gating a down-counter is preset at a computed time interval count and is allowed to count from such count down to zero, at which time firing is instantly triggered.

The purpose of the present invention is to eliminate a time lag, existing with the prior art approach, which prevents an immediate adjustment of the anticipated firing instant in order to match the new reference as the frequency reference changes. The invention is applicable to a simplified circuit, that is, it operates in the context of a system which must remain simple while overcoming the problem caused by the time lag.

SUMMARY OF THE INVENTION

The present invention resides in, at any instant during sequential firing of the static switches of a converter, comparing the magnitude of the new frequency reference with the magnitude of the frequency reference just passed so as to detect an error, and in extending, or shortening, the running count remaining before actual firing by an amount in accordance with the amplitude and sign of the error, thereby to achieve correct firing control in stride with the sequential firing process.

BRIEF DESCRIPTION OF THE DRAWINGS

FIG. 4A shows side-by-side the states of the gate signals for a method according to the prior art and for a method according to the invention for an increase of the frequency whereas;

DETAILED DESCRIPTION OF THE INVENTION

Figure 1:
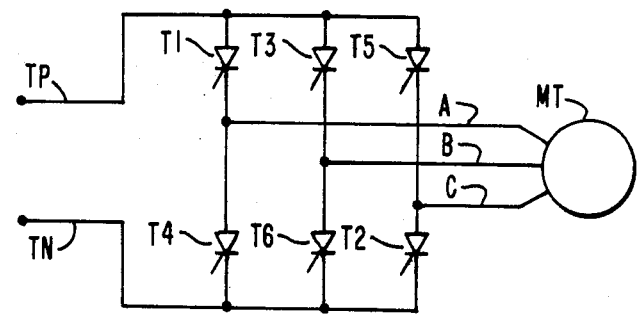
FIG. 1 shows a static controlled AC motor drive to which the invention is applicable.

Referring to FIG. 1, an inverter is shown to include six thyristors (T1-T6), mounted in a bridge between DC input terminals (TN, TP), and AC output terminals (A, B, C) as generally known. The AC output is shown connected to an induction motor MT running at a speed determined by the frequency of sequential firing of the thyristors and the slip of the motor.

Figure 2A:
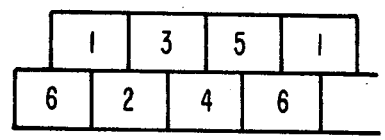
FIGS. 2A, 2B and 3A, 3B show the successive time intervals of conduction of thyristors like in FIG. 1 and the resulting interphase voltage.
Figure 2B:
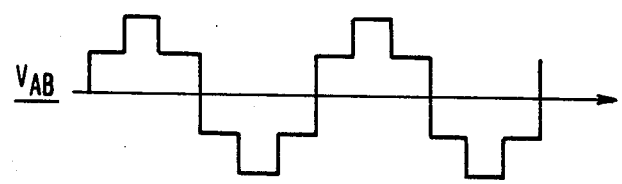

Assuming the duration of conduction for thyristors T1-T6 is 120° electrical angle, and the thyristors are fired in numerical order at 60° from one another, FIG. 2A shows the successive time intervals of conduction of the thyristors and the resulting interphase voltage, $V_{AB}$ for phases A and B, illustratively is shown by FIG. 2B.

Figure 3A:
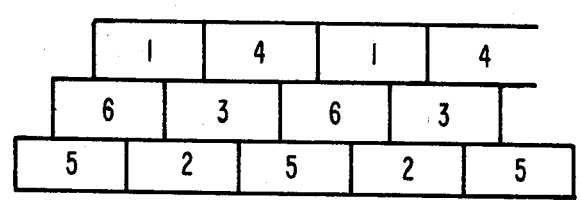
Figure 3B:
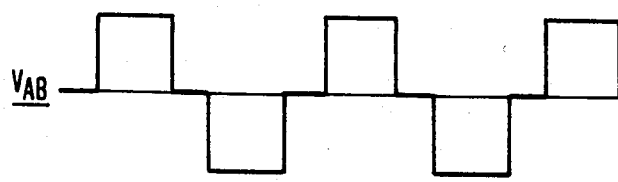

FIGS. 3A and 3B are like FIGS. 2A and 2B, respectively, in the case where the thyristors are being controlled alternatively by pairs for each of three poles (T1,T4); (T6,T3); and (T5,T2), each pole being at 120 degrees, from one another. The thyristors are still coming ON in numerical order and at 60 degrees from one another, but the duration of conduction is here 180 degrees. The time intervals characterizing the thyristors are shown by FIG. 3A. The resulting interphase voltage is illustrated by $V_{AB}$ between lines A and B, illustratively. The invention pertains to anticipating the instant of firing for the thyristor which is "next", while taking into account a rapid change of frequency requiring earlier, or later, firing of such "next" thyristor.

How to control the thyristors of an inverter in order to generate an AC output voltage of required frequency for an AC motor, is well known. How to implement firing in accordance with FIGS. 2A, 2B, or FIGS. 3A, 3B, is also well known. As an illustration in the context of a firing sequence like under FIGS. 3A, 3B, reference is made to the article entitled "Microprocessor-Based Control of an AC Motor Drive" by C. W. Edwards in IEEE-IAS Conference Records October 1982, pages 1-5. For the purpose of disclosing prior art control of an AC motor drive to which the present invention is applicable, the aforementioned article by C. W. Edwards is hereby incorporated by reference.

Figure 4A:
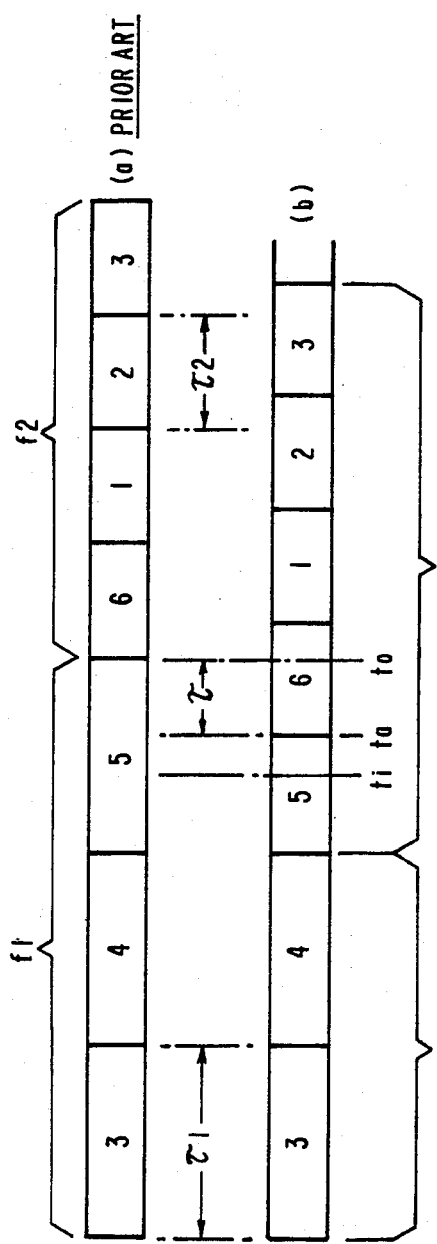

Referring now to FIG. 4A, the states of the gate signals are shown side-by-side for the method (under (b)) according to the invention, as opposed to the method (under (a)) of the prior art. Under (a) the successive occurrence of the thyristors is, after a time interval $\tau_1$ (for T3, T4, T5), until at time instant ti a new value of the frequency reference requires the frequency of the firing sequence to be increased by reducing the time interval from $\tau_1$ to $\tau_2$. Since thyristor T6 is, at that time, set to conduct until time instant $t_o$ (end of $\tau_1$) there is a time lag $\tau$ from the instant $t_a$ (when thyristor T5 should normally end, and thyristor T6 would take over after a duration $\tau_1$ of thyristor T5 conduction) to an instant $t_o$ (which occurs after a duration of t1 for thyristor T5). In contrast, in accordance with the present invention (as seen with curve (b)) at instant ti, the time count for thyristor T5 is immediately reduced to match the new time duration $\tau_2$ for the same thyristor T5, thereby eliminating the time lag $\tau=(to-ta)$.

Figure 4B:
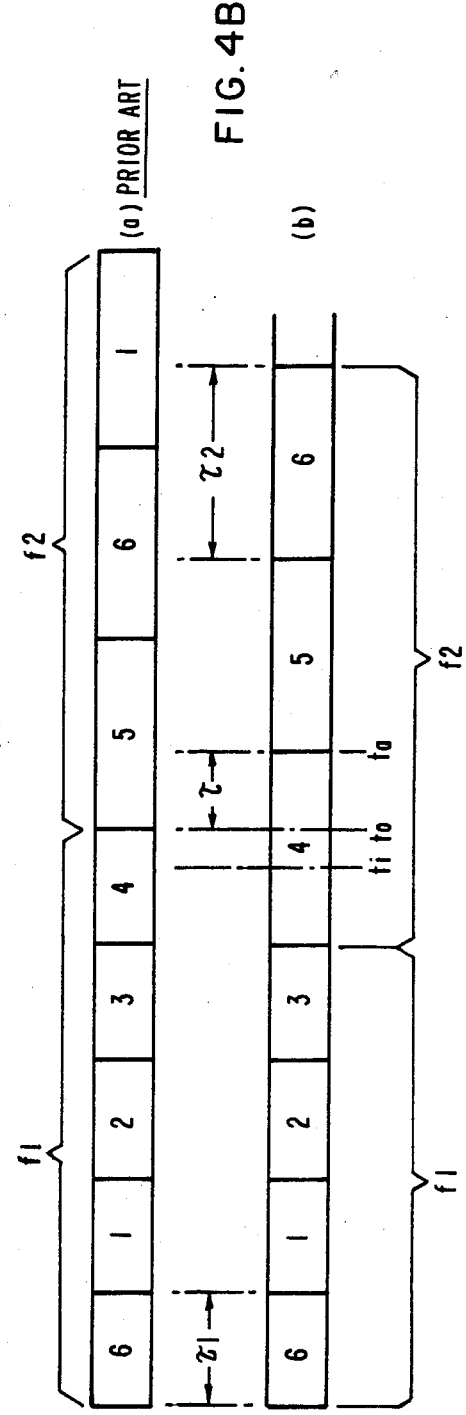
FIG. 4B is similar to FIG. 4A but for a decrease of the frequency.

Similarly, FIG. 4B shows, side by side, the situation according to the present invention (curve (b)) as opposed to the situation under the prior art (curve (a)) when the frequency reference dictates a decreased frequency in the firing sequence. Therefore at instant ti, when the new reference is detected, the ON thyristor T4 (curve (a)) should remain conducting long enough to match a new time interval $\tau_2$, between triggering instants, which is longer than $\tau_1$ as previously. This is achieved by firing T5 at instant $t_a$ (curve (b)) thus later, rather than at instant $t_o$ (curve (b)), thereby eliminating a time lag $\tau=(ta-to)$.

In both instances the transport delay has been reduced. From initial instant $t_i$ the new firing sequence (5, 6, 1, 2 in FIG. 4A, 4, 5, 6, ... in FIG. 4B) takes over, rather than as late as 6, 1, 2 ... in FIG. 4A, or 5, 6, 1 . . . in FIG. 4B, with the prior art approach.

Figure 5:
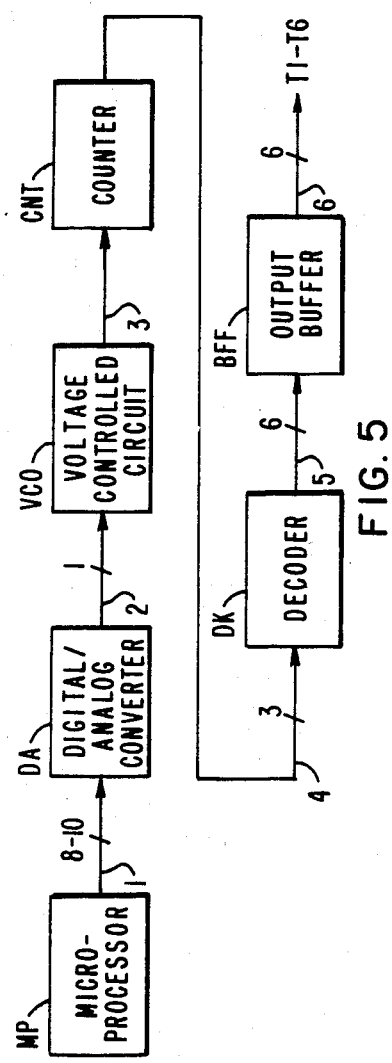
FIG. 5 is a block diagram of a microprocessor-based system for analog implementation of a firing sequence according to the prior art.

FIG. 5 is a block diagram of a microprocessor-based system for analog implementation of a firing sequence according to the prior art. The microprocessor MP establishes on lines 1 (eight parallel lines for 8-bit word, or 10 lines for a 10-bit word) a digital signal representing the desired value of the firing frequency when sequentially gating thyristors T1-T6. Lines 1 are inputted into a digital-to-analog converter DA which outputs on line 2 a voltage signal of amplitude representing the assigned frequency. A voltage-controlled circuit VCO converts the magnitude of the signal of line 2 into a pulse train (line 3) of corresponding frequency. The frequency signal of line 3 goes into a counter (CNT) which runs at such corresponding frequency. The outputted count of line 4 (typically by three lines) is decoded by decoder DK to provide, on lines 5, six distributed signals corresponding to the six gating lines of thyristors T1-T6, respectively. The ring-counter, contained in decoder DK, successively triggers the six lines of lines 5 to sequentially fire the respective thyristors, after buffering by output buffer BFF, and to generate the proper signals on lines 6, which are six parallel lines. Since upon a change of the frequency of line 3, counter CNT assumes a new value only after the current count has expired (namely at instant $t_o$ in FIGS. 4A, 4B) a time lag exists before the counter can assume the new count for the "next" thyristor to be fired. With the present invention the thyristor which is "ON" will be fired in accordance with the new count, thereby eliminating transport delay.

Figure 6:
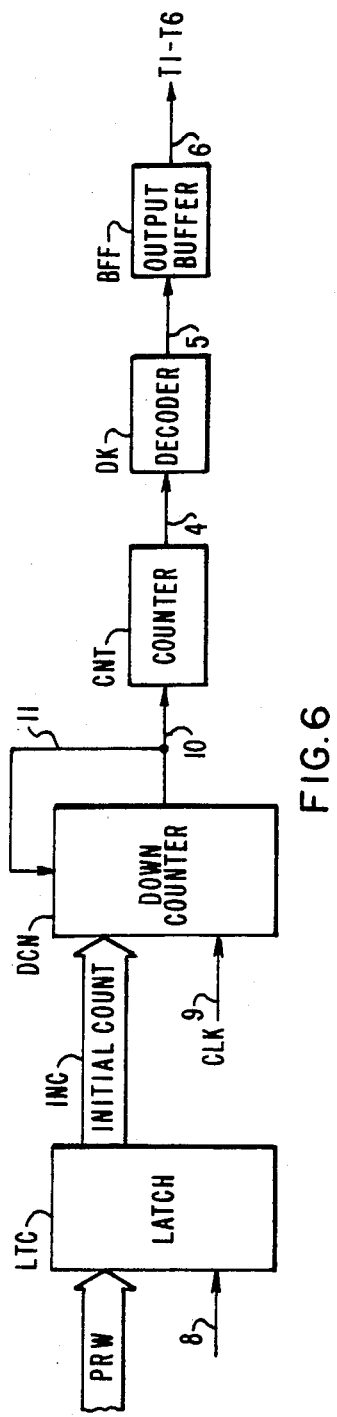
FIG. 6 is a digital implementation of the prior art approach of FIG. 5.

Referring to FIG. 6, a digital implementation of the prior art approach of FIG. 5 is shown. From a part of the host processor is derived a period reference word (PRW) representing the desired frequency, actually the inverse of the frequency. The PRW value is latched into a latch LTC upon a WRITE command (line 8), thereby to freeze the PRW value therein. The latch value is stored into a down-counter DCN activated by a clock signal CLK (line 9). Counter DCN outputs a running count which eventually reaches its terminal count, at which time by line 11 the down-counter is reset to the initial count from latch LTC. Down-counter DCN by line 10 feeds into counter CNT, the output of which goes to a decoder DK which leads to a buffer BFF as in FIG. 5.

Figure 7:
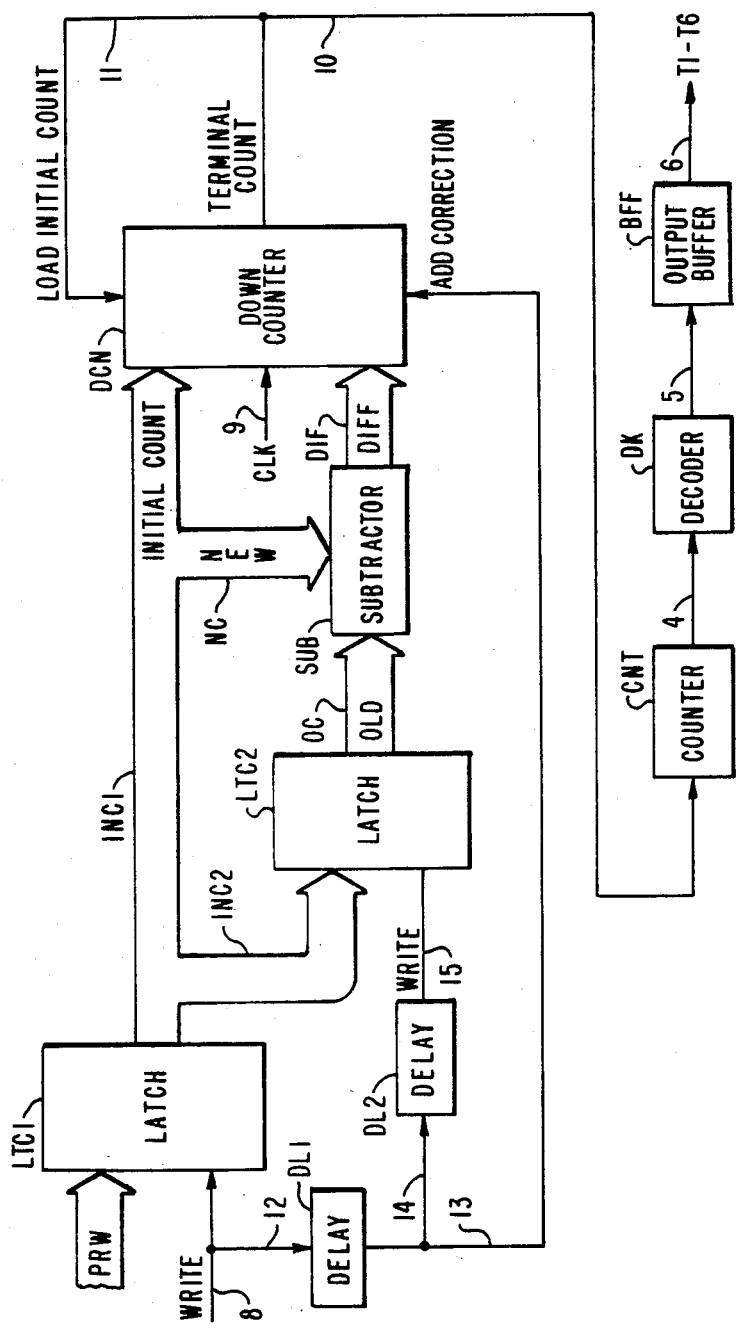
FIG. 7 illustrates in block diagram digital treatment of the firing control system according to the invention.

FIG. 7 illustrates with a block diagram digital treatment for the implementation of a firing control system according to the present invention.

The period reference word (namely the inverse of the desired frequency) received from the host processor is latched into latch LTC1 in response to a WRITE command on line 8. The latched value is used by binary lines INC1 as an initial count to preset down-counter DCN, which eventually outputs a terminal count on line 10 to reset itself by line 11 and to control by line 10 counter CNT. Counter CNT goes by line 4 to decoder DK. By line 5 the output of decoder DK goes to buffer BFF for gating the thyristor T1-T6. All this is as described by reference to FIG. 6.

It is assumed now that the period reference word (PRW) is changed to represent a new value (NC) corresponding to a frequency f2, rather than the old value f1, as in FIGS. 4A, 4B. Then, the value is latched into LTC1 and carried, via lines INC1 is carried via lines INC2, and in turn is latched into a second latch LTC2 which is controlled by a WRITE command received on line 15. The command of line 15 follows the command of line 8, after two successive delays (DL1) and (DL2) interposed one (DL1) on line 12 from line 8 and the other (DL2) on line 14 after DL1. Therefore, whenever the PRW value has changed, INC1 will be modified immediately according to the command of line 8, whereas, the value of INC1 and INC2 latched into LTC2 will not appear until later according to the command of line 15. Accordingly, on NC from INC1 and on OC from latch LTC2, the *new* and the *old* value will respectively appear. A subtractor (SUB) responds to NC and OC to derive on lines DIF an error between *old* and *new*. The error corresponds to the lag $\tau = (t_o - t_a)$ in the event that f2 > f1 as in FIG. 4A, or to $\tau = (t_a - t_o)$ when f2 < f1 as in FIG. 4B. Down-counter DCN is controlled by line 13 following the command of lines 8 and 12, but after the interposed delay (DL1), so as to generate a command signal to algebraically add the value existing an output lines DIF to the present initial count INC1, or NC, however, with the delay DL1 which is less than (DL1)+(DL2), thereby allowing time for a subsequent change, by latch LTC2 and line OC, into subtractor SUB. Therefore, the active count of line 10 from down-counter DCN will be immediately responsive to a preset value which is either decreased (FIG. 4A), or increased (FIG. 4B), since at time $t_i$ plus a delay DL1 the down-counter will match in value a down-count leading to terminal count at $t_a$, rather than $t_o$.

It is understood that the difference DIF derived by comparing the new data of input NC to the previous value of PRW held in latch LTC2 as OLD data on input OC, is calculated in subtractor SUB, while the sign is detected, and that the amplitude is manipulated for outputting in relation to counter DCN, as generally known.

I claim:

1. A gating control system for firing sequentially a plurality of static switches by applying and distributing in successive order among said static switches gating pulses at regular time intervals characteristic of the firing frequency, comprising:

means responsive to a firing frequency representative reference signal for generating a time signal characteristic of the pulse spacing, counting means recurrently responsive to said time signal for assuming an initial count representative of said pulse spacing and for down-counting from said initial count to a terminal count, gating means responsive to said terminal count for firing at least one static switch which is "next" in said plurality, means responsive to said time signal for detecting a change therein in relation to a change in said reference signal, and means for modifying the operation of said counting means during said down-counting to alter said terminal count in accordance with said reference signal change, whereby the occurrence of firing of said "next" static switch is concurrently modified, and sequential firing is established at a corresponding new frequency.

2. The system of claim 1 with said modifying means being operative on the instantaneous count of said counting means between said initial count and said terminal count, when said frequency reference signal has changed after said initial count.

3. The system of claim 2 with said instantaneous count being increased when said frequency reference signal has decreased.

4. The system of claim 2 with said instantaneous count being decreased when said frequency reference signal has increased.

5. The system of claim 2 with said detecting means including first means controlled in relation with the occurrence of said terminal count for storing a first signal representative of said time signal, and second means controlled a predetermined time interval thereafter for storing a second signal representative of said time signal, and differential means responsive to said stored first and second signals for deriving an error signal, said modifying means being responsive to said error signal and operative on said counting means in relation thereto.

6. The system of claim 5 with said error signal being given a sign depending upon one of an excess and a want in said second stored signal relative to said first stored signal.

* * * * *